United States Patent
Peterson

(10) Patent No.: US 9,599,244 B2
(45) Date of Patent: Mar. 21, 2017

(54) BYPASS VALVE

(71) Applicant: Flextronics Automotive, Inc, Milpitas, CA (US)

(72) Inventor: Matthew Peterson, Ada, MI (US)

(73) Assignee: Flextronics Automotive, Inc., San Jose, CA (US)

(*) Notice: Subject to any disclaimer, the term of this patent is extended or adjusted under 35 U.S.C. 154(b) by 152 days.

(21) Appl. No.: 14/296,719

(22) Filed: Jun. 5, 2014

(65) Prior Publication Data

US 2015/0059902 A1 Mar. 5, 2015

Related U.S. Application Data

(60) Provisional application No. 61/872,178, filed on Aug. 30, 2013.

(51) Int. Cl.
| | |
|---|---|
| F16K 11/048 | (2006.01) |
| F16K 27/00 | (2006.01) |
| F16K 11/074 | (2006.01) |
| F16K 31/06 | (2006.01) |
| H01F 7/121 | (2006.01) |
| H01F 7/16 | (2006.01) |

(52) U.S. Cl.
CPC .......... F16K 27/003 (2013.01); F16K 11/048 (2013.01); F16K 11/0743 (2013.01); F16K 31/0603 (2013.01); F16K 31/0624 (2013.01); F16K 31/0634 (2013.01); H01F 7/121 (2013.01); H01F 7/1607 (2013.01); *Y10T 137/87708* (2015.04); *Y10T 137/87772* (2015.04)

(58) Field of Classification Search
CPC ...... F16K 11/048; F16K 31/06; F16K 27/003; F16K 31/0634; F16K 11/0743; F16K 31/0624; F16K 31/0603; H01F 7/13; H01F 7/1615; Y10T 137/87772; Y10T 137/87708; Y10T 137/86895
USPC ..................................... 137/625.5, 870, 862
See application file for complete search history.

(56) References Cited

U.S. PATENT DOCUMENTS

| | | | |
|---|---|---|---|
| 2,255,292 | A | 9/1941 | Lincoln |
| 2,512,189 | A | 6/1950 | Waterman |
| 2,522,249 | A | 9/1950 | Baker |
| 2,790,605 | A | 4/1957 | Peterson et al. |
| 2,874,929 | A | 2/1959 | Klinger |
| 2,912,012 | A | 11/1959 | Klinger |
| 2,934,090 | A | 4/1960 | Kenann et al. |
| 3,211,374 | A | 10/1965 | Matulaitis |
| 3,329,165 | A | 7/1967 | Lang |

(Continued)

FOREIGN PATENT DOCUMENTS

| | | |
|---|---|---|
| DE | 195 40 580 A1 | 5/1997 |
| DE | 10 2005 038185 A1 | 2/2007 |

(Continued)

*Primary Examiner* — Michael R Reid
*Assistant Examiner* — Christopher Ballman
(74) *Attorney, Agent, or Firm* — Volpe and Koenig, P.C.

(57) ABSTRACT

A bypass valve and a valve assembly including a bypass valve are disclosed. The bypass valve includes a manifold having 4 ports and a valve stem including two sealing elements disposed along the valve stem length. The valve stem may be displaced to a first valve position and a second valve position to selectably place combinations of ports in fluid communication with each other.

14 Claims, 4 Drawing Sheets

(56) References Cited

U.S. PATENT DOCUMENTS

| | | |
|---|---|---|
| 3,351,128 A | 11/1967 | Barnd |
| 3,525,364 A | 8/1970 | Esche |
| 3,940,222 A | 2/1976 | Zink |
| 3,974,998 A | 8/1976 | Wood |
| 3,989,063 A | 11/1976 | Brouwers et al. |
| 4,078,579 A | 3/1978 | Bucko, Sr. |
| 4,193,423 A | 3/1980 | Stoll et al. |
| 4,285,497 A | 8/1981 | Gottel |
| 4,641,686 A | 2/1987 | Thompson |
| 4,807,665 A | 2/1989 | Schiel |
| 4,852,612 A | 8/1989 | Bucko, Sr. |
| 4,874,010 A | 10/1989 | DeJong et al. |
| 5,184,773 A * | 2/1993 | Everingham ...... B60H 1/00485 137/115.25 |
| 5,265,547 A | 11/1993 | Daws |
| 5,443,241 A * | 8/1995 | Odaira .................. F01P 7/14 137/625.5 |
| 5,456,286 A | 10/1995 | Warner et al. |
| 5,564,458 A * | 10/1996 | Roth .................. B60H 1/00485 137/115.06 |
| 5,799,696 A | 9/1998 | Weiss |
| 5,809,944 A | 9/1998 | Aoki et al. |
| 5,944,053 A | 8/1999 | Kabierschke et al. |
| 5,950,576 A | 9/1999 | Busato et al. |
| 5,979,484 A | 11/1999 | Grando et al. |
| 6,019,120 A | 2/2000 | Najmolhoda et al. |
| 6,109,300 A | 8/2000 | Najmolhoda |
| 6,109,301 A * | 8/2000 | Pfetzer ............... B60H 1/00485 137/599.14 |
| 6,109,302 A | 8/2000 | Bircann |
| 6,196,167 B1 | 3/2001 | Marsh et al. |
| 6,588,442 B2 | 7/2003 | Babin |
| 6,644,352 B1 | 11/2003 | Pfetzer |
| 6,712,093 B2 | 3/2004 | Hess et al. |
| 6,814,102 B2 | 11/2004 | Hess et al. |
| 6,830,067 B2 | 12/2004 | Hayashi |
| 6,955,141 B2 | 10/2005 | Santanam et al. |
| 6,955,188 B2 | 10/2005 | Heckt |
| 7,182,101 B2 | 2/2007 | Alacqua et al. |
| 7,216,697 B2 | 5/2007 | Odeskog et al. |
| 7,534,074 B2 | 5/2009 | Kato |
| 8,127,791 B2 | 3/2012 | Najmolhoda et al. |
| 8,162,004 B2 | 4/2012 | Albert |
| 2002/0084068 A1 | 7/2002 | Hugger |
| 2003/0150498 A1 | 8/2003 | Williams |
| 2003/0217775 A1 | 11/2003 | Cousineau et al. |
| 2004/0182455 A1 | 9/2004 | Wells et al. |
| 2009/0114865 A1 | 5/2009 | Homann et al. |
| 2011/0024513 A1 | 2/2011 | Davidson |
| 2011/0073285 A1 | 3/2011 | Benoit et al. |
| 2011/0132483 A1 | 6/2011 | Kim et al. |
| 2012/0048411 A1 | 3/2012 | Steyer et al. |

FOREIGN PATENT DOCUMENTS

| | | |
|---|---|---|
| DE | 20 2011 107875 U1 | 2/2012 |
| EP | 0 288 045 A2 | 10/1988 |
| EP | 1 801 477 A2 | 6/2007 |

\* cited by examiner

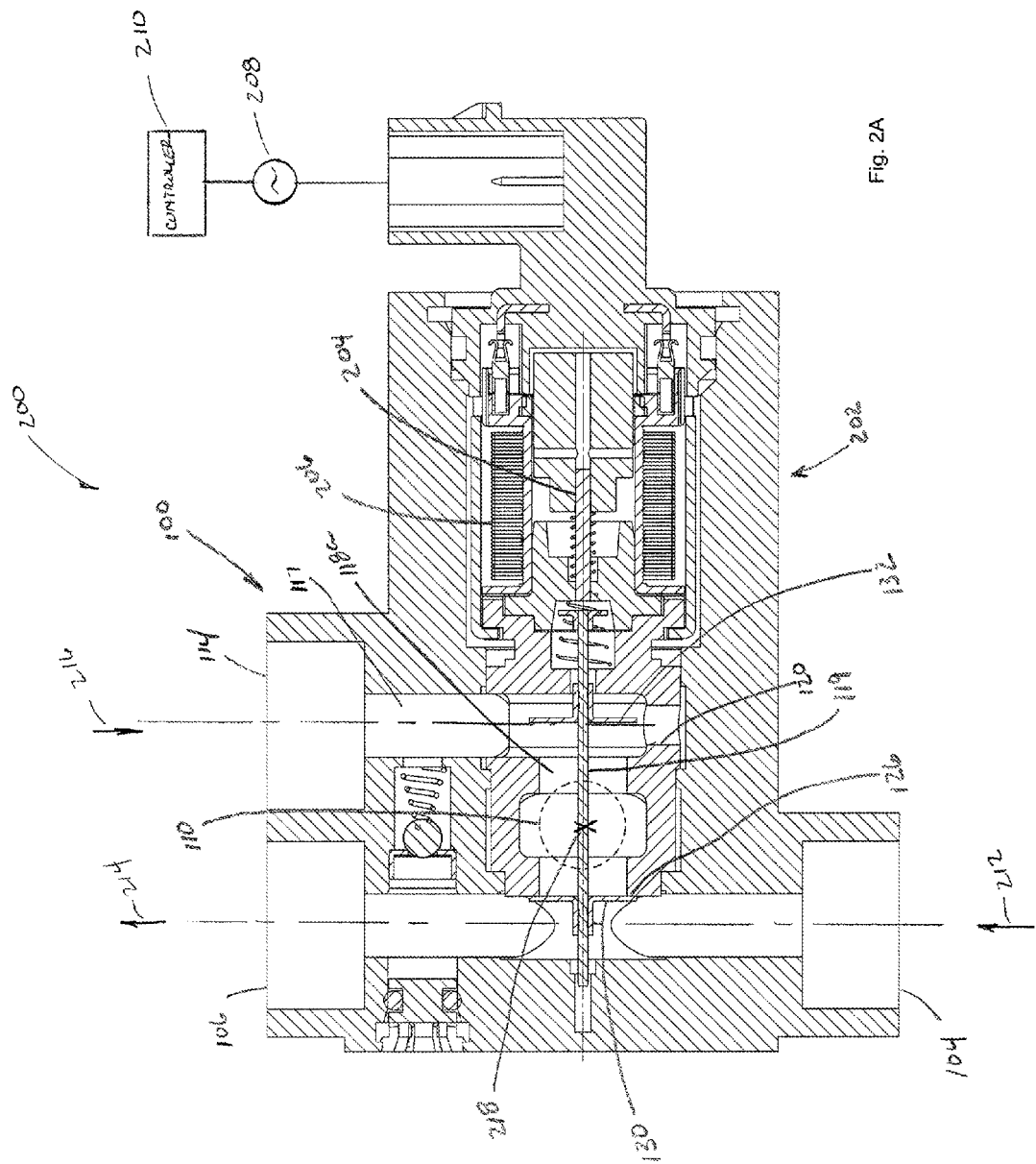

BYPASS VALVE

CROSS REFERENCE TO RELATED APPLICATION

This application claims the benefit of U.S. Provisional Application No. 61/872,178 filed Aug. 30, 2013, the contents of which is herein incorporated by reference as if fully set forth.

FIELD OF INVENTION

Embodiments of the present invention generally relate to bypass valves and valve systems using a bypass valve.

BACKGROUND

Bypass valves may be used in valve systems in which it is desirable to selectably direct a flow from one inlet to one of two fluid paths. Bypass valves generally include an actuator to selectably direct the flow to the desired fluid path.

In some applications, for example automotive thermal control systems, the actuator of a thermal bypass valve directs the flow to one of the two alternate paths depending on a thermal condition of the fluid flowing through the valve. Currently, thermal bypass valves use a wax motor to sense temperature and respond by actuating a thermal bypass valve. However, wax motors may be inaccurate, unreliable, and slow to react to operating conditions.

Accordingly, a need exists for a thermal bypass valve that overcomes these shortcomings.

SUMMARY

Embodiments of a bypass valve and a valve assembly are provided herein. In some embodiments, a bypass valve comprises a manifold including a first port and a second port coupled together in fluid communication; a third port in selectable fluid communication with the first port and the second port; and a fourth port in selectable fluid communication with the third port. A valve stem is supported for linear displacement between a first position and a second position. A first sealing element is fixed linearly along a length of the valve stem and a second sealing element is fixed linearly along the length of the valve stem, spaced apart from the first sealing element. The first position of the valve stem disposes the first sealing element to close the third port from fluid communication with the first and second ports and disposes the second sealing element to open the third port to fluid communication with the fourth port. The second position of the valve stem disposes the first sealing element to open the third port to fluid communication with the first and second ports and disposes the second sealing element to close the third port from fluid communication with the fourth port.

In some embodiments, a valve assembly comprises a manifold including a first port and a second port coupled together in fluid communication; a third port in selectable fluid communication with the first port and the second port; and a fourth port in selectable fluid communication with the third port. A valve stem is supported for linear displacement between a first position and a second position. A first sealing element is fixed linearly along a length of the valve stem and a second sealing element is fixed linearly along the length of the valve stem, spaced apart from the first sealing element. The first position of the valve stem disposes the first sealing element to close the third port from fluid communication with the first and second ports and disposes the second sealing element to open the third port to fluid communication with the fourth port. The second position of the valve stem disposes the first sealing element to open the third port to fluid communication with the first and second ports and disposes the second sealing element to close the third port from fluid communication with the fourth port. An actuator is linked to the valve, the actuator including a movable armature supported for linear displacement between a first position and a second position. The armature is aligned with the valve stem such that the valve stem is displaced in response to displacement of the armature.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

FIG. 2A depicts a sectional view of a bypass valve assembly in accordance with an embodiment of the present invention in a first position.

Figure 1A:
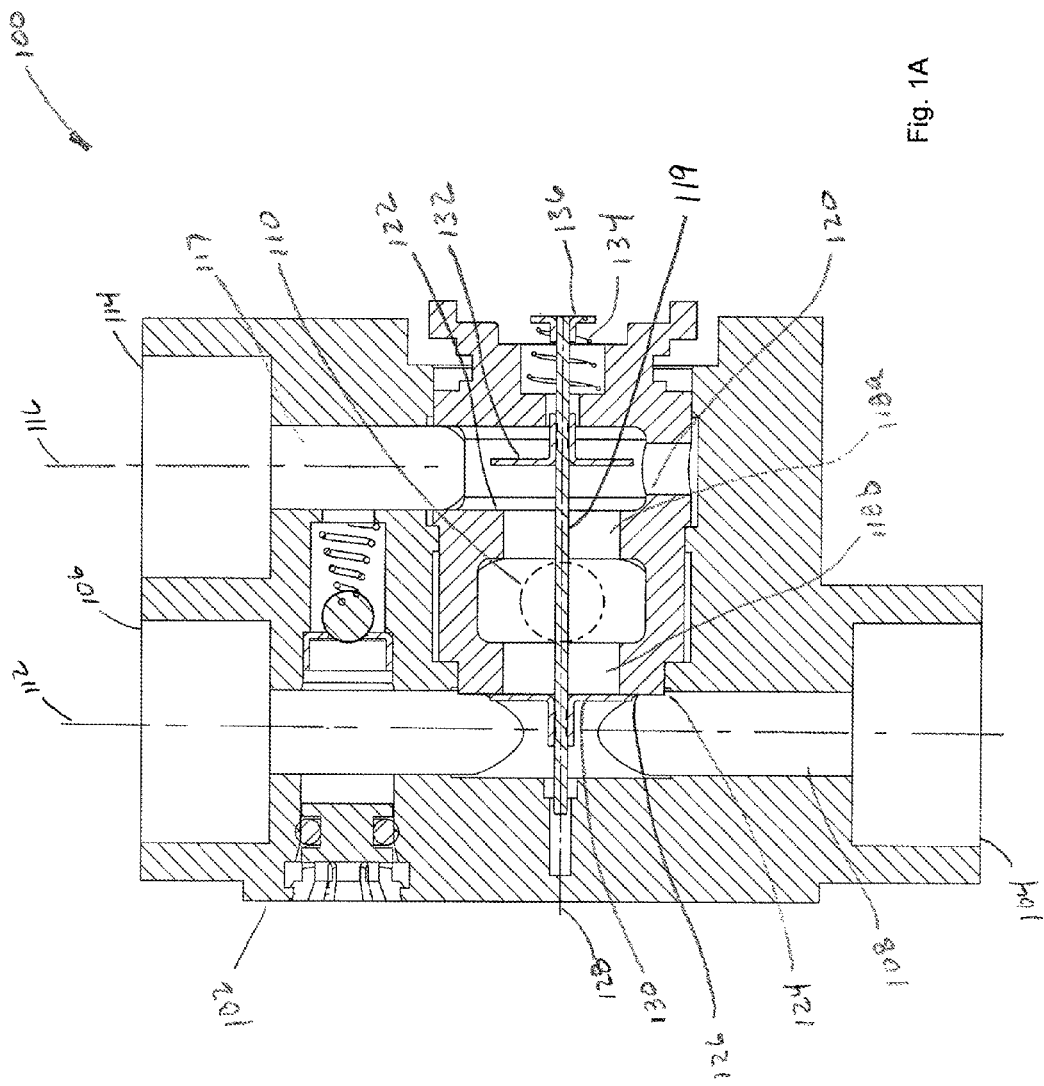
FIG. 1A depicts a sectional view of a bypass valve in accordance with an embodiment of the present invention in a first position.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to a thermal bypass valve for an automotive thermal control system, the present invention may be modified for a variety of applications while remaining within the spirit and scope of the claimed invention, since the range of the potential applications is great, and because it is intended that the present invention be adaptable to many such variations.

DETAILED DESCRIPTION

FIG. 1A depicts a non-limiting bypass valve, valve 100, in accordance with an embodiment of the present invention. The valve 100 comprises a manifold 102 having a first port 104 in fluid communication with a second port 106. As illustrated, a conduit 108 connects the first port 104 and the second port 106, however the ports may be in direct communication with no connecting element. The first and second ports 104, 106 are shown as collinear along axis 112 for ease of illustration only. The first port 104 and the second port 106 may have coplanar axes that are oriented in angular relationships other than 180 degrees.

The manifold 102 includes a third port 110 offset from the first and second ports 104, 106 and in selectable fluid communication (to be discussed below) with the first port 104 and the second port 106 via the conduits 118*b* and 108.

In embodiments in which the first and second ports 104, 106 are in direct fluid communication, the third port 110 is in direct fluid communication with the first port 104 and the second port 106 at a point between the two ports. The third port 110 is illustrated in a dashed line to signify the axis of the port is perpendicular to the page as drawn and perpendicular to the axis 112. The orientation of the third port 110 as drawn is for clarity and ease of illustration only. The third port 110 may be oriented at other angular orientations to the axis 112 and to the page.

A fourth port 114 is included in the manifold 102 offset from the first port 104, the second port 106, and the third port 110, and in selectable fluid communication with the third port 110 (to be discussed below) via conduits 117 and 118a. The axis 116 of the fourth port 114 is parallel with the axis 112 and perpendicular to the third port 110 as illustrated in FIG. 1A for clarity and ease of illustration only. The fourth port 114 may be oriented at other angular orientations to the first, second, and third ports 104, 106, and 110, respectively.

Conduits 118a and 118b are aligned along axis 128 in the manifold 102 and may collectively be conduit 118. Conduit 118a terminates at a first end 120 with a first sealing surface 122. Conduit 118b terminates at a second end 124 with a second sealing surface 126.

Figure 1B:
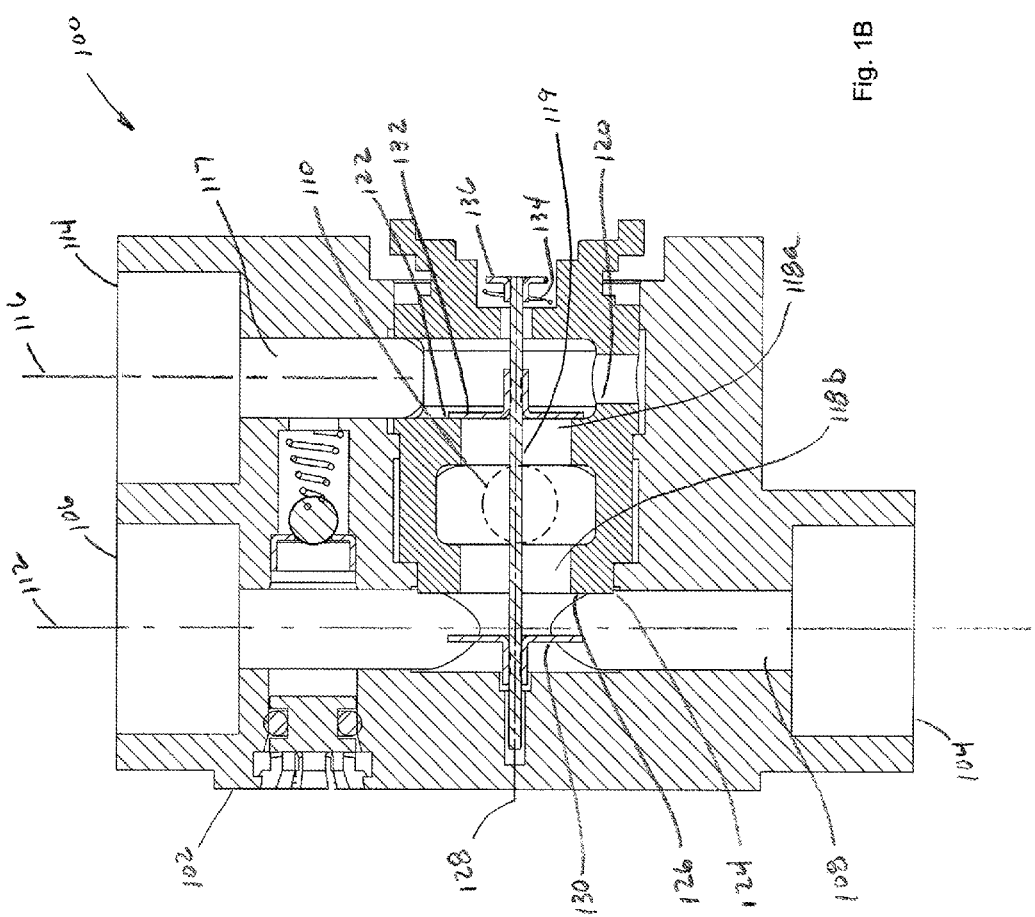
FIG. 1B depicts a sectional view of the bypass valve of FIG. 1A in a second position.

A valve stem 119 is disposed within the manifold 102 aligned with axis 128 and supported for linear displacement along the axis 128 between at least a first valve position shown in FIG. 1A and a second valve position shown in FIG. 1B. A first sealing element 130 is fixed linearly along the length of the valve stem 119 at a first location such that the first sealing element 130 is disposed in the conduit 108 between the first and second ports 104, 106 adjacent to the second end 124 of conduit 118b. In embodiments not including conduit 108, the first sealing element 130 is disposed directly between the first port 104 and the second port 106.

A second sealing element 132 is fixed linearly along the length of the valve stem 119 at a second location spaced apart from the first sealing element 130 such that the second sealing element 132 is disposed in the conduit 117 adjacent to the first end 120 of conduit 118a.

In the first valve position, the valve stem 119 is disposed to the right as drawn in FIG. 1A such that the first sealing element 130 is in a sealing position abutting the second sealing surface 126. A sealing surface of the first sealing element 130 and the second sealing surface 126 cooperate to close the third port 110 from fluid communication with the first port 104, the second port 106, and the conduit 108 (if present). For purposes of this disclosure, a port is closed to fluid communication if flow is prevented, or substantially prevented, from flowing to the closed port. Conversely, a port is open to fluid communication if flow is provided to the open port.

In the first valve position, the second sealing element 132 is disposed such that the third port 110 is open to fluid communication with the fourth port 114 and conduit 117. In the non-limiting embodiment illustrated in FIG. 1A, the second sealing element 132 is disposed in approximately the middle of conduit 117 when the valve stem 119 is in the first valve position, although any position that leaves the third port 110 open to fluid communication with the fourth port 114 would be acceptable.

The valve stem 119 may be urged into the first valve position by a resilient element, such as spring 134, captured between a portion of the manifold 102 and a cap 136 disposed on an end of the valve stem 119. The resilient member 134 exerts a resilient force against the cap 136 to maintain the valve stem 119 in the first valve position.

In the second valve position, as illustrated in FIG. 1B, the valve stem 119 is disposed to the left as drawn such that the first sealing element moves away from the second end of conduit 118b and opens the third port 110 to fluid communication with the first port 104, the second port 106, and the conduit 108 (if present). A sealing surface of the second sealing element 132 is disposed to a sealing position abutting the first sealing surface 122 such that the second sealing element 132 and the first sealing surface 122 cooperate to close the fourth port 114 from fluid communication with the third port 110.

In both the first valve position of FIG. 1A and the second valve position of FIG. 1B, the first port 104 open in fluid communication with the second port 106.

The first and second sealing elements 130, 132 are illustrated as generally flat disks for ease of illustration only. The sealing elements 130, 132 may be any configuration, including size, shape, and material, suitable to open or close the third port 110 for selectable fluid communication with the first and second ports 104, 106, or with the fourth port 114.

Figure 2B:
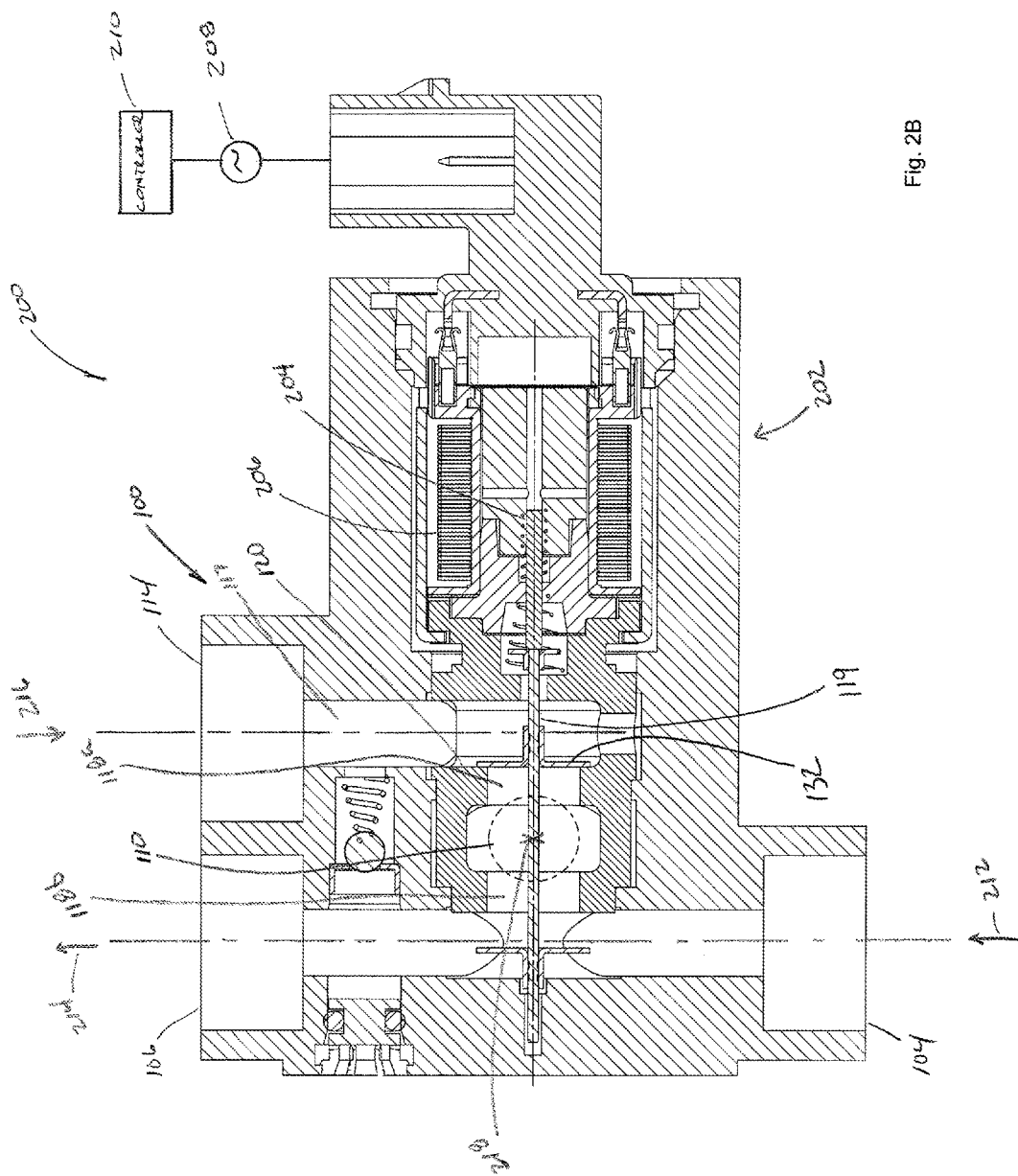
FIG. 2B depicts a sectional view of the bypass valve assembly of FIG. 2A in a second position.

FIGS. 2A and 2B are illustrative of a bypass valve assembly, assembly 200, in accordance with an embodiment of the present invention. Assembly 200 includes bypass valve 100 coupled to an actuator, for example an electromechanical solenoid, solenoid 202. Other actuators may also be used. The solenoid 202 includes a movable armature 204 supported for linear displacement between at least a first armature position of FIG. 2A and a second armature position of FIG. 2B. The armature 204 is aligned with and linked to the valve stem 119 such that the valve stem 119 is displaced in response to linear displacement of the armature 204. The armature position and the second armature position correspond to the first valve position and the second valve position of FIGS. 1A and 1B.

A coil 206 in the solenoid 202 is electrically coupled to a power source 208 controlled by a controller 210 through an electrical coupling for providing a selectable electrical signal, such as a current, to the coil 206. The armature 204 is movable in response to a current applied to the coil 212. The controller 210 may provide at least a first electrical signal and a second electrical signal to the coil 212 corresponding to a first energy condition and a second energy condition, respectively. For example, the first electrical signal may be a 0 ampere current corresponding to a de-energized solenoid condition and the second electrical signal may correspond to a greater, or non-zero ampere, current corresponding to an energized solenoid condition. The first energy condition moves the armature to a first position corresponding to the first valve position and the second energy condition moves the armature to a second position corresponding to the second valve position.

The first port 104 of the bypass valve assembly of FIGS. 2A and 2B may be fluidly coupled to a source of fluid having at least heat transfer capabilities. In some embodiments, the first port 104 may be fluidly coupled to an outflow of fluid from an automotive transmission.

The second port 106 may be fluidly coupled to an input of a thermal transfer device and the fourth port 114 may be fluidly coupled to an output of the thermal transfer device. The third port 110 may be fluidly coupled to holding location, for example an automotive transmission sump configured to provide transmission fluid to the transmission.

In an embodiment, the thermal transfer device is a cooler, for example a transmission cooler, configured to remove heat from a transmission fluid flowing through heat transfer elements of the cooler.

As described above, in the first valve position of FIGS. 1A and 2A, the valve stem 119 is disposed to the right as drawn such that the first sealing element 130 is in a sealing position abutting the second sealing surface 126, closing the third port 110 from fluid communication with the first port 104, the second port 106. In the first valve position, the second sealing element 132 is disposed such that the third port 110 is open to fluid communication with the fourth port 114 and conduit 117.

Configured as described above in the first position, a fluid flowing flow into the first port 104 (as indicated by arrow 212) continues to flow out of second port 106 (as indicated by arrow 214) and into a transmission cooler (not shown). The flow returns to the bypass valve through fourth port 114 (as indicated by arrow 216) into conduit 117 which terminates at an end opposite port third 114. Flow continues into conduit 118a and out third port 110 (as indicated by the tail of arrow 218) to an automotive transmission sump. This condition may be associated with a non-energized actuator, for example solenoid 202, and represents the default, or fail-safe, condition. The first valve position may correspond with the normal operating condition for an automotive transmission. Following initial warm-up, flow through the cooler removes excess heat from the transmission fluid to beneficially maintain the fluid at a desired or operational temperature or range of temperatures.

The second valve position of FIGS. 1B and 2B may correspond with an initial warm-up period of an automotive transmission. A non-zero electrical signal may be provided by the power source 208 and controlled by the controller 210 such that the valve stem 119 is placed in the second valve position with the second sealing element 132 in a sealing position against the first end 120, closing conduits 117 and 118a to flow.

Fluid flow 212 into first port 104 may initially flow 214 out of second port 106, into a thermal transfer device (not shown). A flow 216 may continue from the thermal transfer device into fourth port 114 and conduit 117. However, the flow 216 cannot exit conduit 117, resulting in cessation of flows 216 and 214. The flow 212 is directed into conduit 118b and out third port 110 (as indicated by the tail of arrow 218) an automotive transmission sump. This condition may be associated with an energized actuator, for example solenoid 202. The second valve position may correspond with the initial start-up condition for an automotive transmission. By blocking the transmission fluid flow to the transmission cooler, heat is not removed from the transmission fluid and the transmission may attain operational temperature more quickly. Improved transmission function and performance may be associated with attaining operational temperature in an automotive transmission.

Thus a bypass valve and a bypass valve assembly are provided herein. The inventive bypass valve and a bypass valve assembly may advantageously improve the accuracy, reliability, and reaction speed of bypass valve in an automotive thermal control system.

Those of ordinary skill in the art may recognize that many modification and variations of the above may be implemented without departing from the spirit or scope of the following claims. For example, although reference to an automotive transmission is made, other mechanical systems sensitive to thermal conditions for optimum performance may benefit from the disclosed fluid control valve and valve system.

What is claimed is:

1. A bypass valve comprising:
   a manifold comprising:
      a first port configured as a first fluid input port and a second port coupled together in fluid communication and configured as a first fluid output port;
      a third port in selectable fluid communication with the first port and the second port and configured as a second fluid output port; and
      a fourth port in selectable fluid communication with the third port and configured as a second fluid input port;
   a valve stem supported for linear displacement between a first valve position and a second valve position;
   a first sealing element fixed linearly along a length of the valve stem; and
   a second sealing element fixed linearly along the length of the valve stem, spaced apart from the first sealing element; wherein
   a central axis crossing an opening of the third port is non-parallel to and between central axes of the first and second ports each crossing respective openings of the first and second ports;
   the first valve position disposes the first sealing element to close the third port from fluid communication with the first and second ports and disposes the second sealing element to open the third port to fluid communication with the fourth port such that the direction of fluid flow through the bypass valve in the first valve position:
      begins with fluid flow into the first port, followed by fluid flow out of a second port, re-entry into the bypass valve through the fourth port then into the third port, the fluid exiting from the third port where it no longer re-circulates through the bypass valve; and
   the second valve position disposes the first sealing element to open the third port to fluid communication with the first and second ports and disposes the second sealing element to close the third port from fluid communication with the fourth port such that the direction of the fluid flow through the bypass valve in the second position:
      begins with fluid flow into the first port, followed by fluid flow out of the second port, re-entry into the bypass valve through the fourth port, wherein fluid flow is prevented from accessing the third port following re-entry of a fluid into the bypass valve, fluid flow re-entry into the bypass valve eventually ceasing, and
      fluid flow from entry into the first port is directed directly to the third port, the fluid exiting from the third port where it no longer re-circulates through the bypass valve.

2. The bypass valve of claim 1, wherein the first port and the second port are in selectable fluid communication via a first conduit.

3. The bypass valve of claim 1, wherein the fourth port is in selectable fluid communication with the third port via a second conduit.

4. The bypass valve of claim 1, wherein the first port and the second port are in fluid communication when the valve stem is in the first position and in the second position.

5. The bypass valve of claim 1, wherein one of the first or second sealing elements is a poppet valve.

6. The bypass valve of claim 1, wherein an axis of the first port and an axis of the second port are collinear and aligned with an axis of the first conduit.

7. The bypass valve of claim 6, wherein an axis of the fourth port is collinear with an axis of the second conduit and parallel to the axes of the first and second ports.

8. The bypass valve of claim 7, wherein an axis of the third port is disposed between the axis of the first conduit and the axis of the second conduit.

9. The bypass valve of claim 8, wherein the axis of the third port is perpendicular to the plane formed by the axes of the first conduit and the second conduit.

10. A valve assembly comprising:
a bypass valve; and
an actuator linked to the bypass valve, the actuator including a movable armature supported for linear displacement between a first position and a second position, wherein the movable armature is aligned with the valve stem such that the valve stem is displaced in response to displacement of the movable armature, wherein
the bypass valve comprises:
a manifold comprising:
a first port configured as a first fluid input port and a second port coupled together in fluid communication and configured as a first fluid output port;
a third port in selectable fluid communication with the first port and the second port and configured as a second fluid output port; and
a fourth port in selectable fluid communication with the third port and configured as a second fluid input port;
a valve stem supported for linear displacement between a first valve position and a second valve position;
a first sealing element fixed linearly along a length of the valve stem; and
a second sealing element fixed linearly along the length of the valve stem, spaced apart from the first sealing element; wherein
a central axis crossing an opening of the third port is non-parallel to and between central axes of the first and second ports each crossing respective openings of the first and second ports;
the first valve position disposes the first sealing element to close the third port from fluid communication with the first and second ports and disposes the second sealing element to open the third port to fluid communication with the fourth port such that the direction of fluid flow through the bypass valve in the first valve position:
begins with fluid flow into the first port, followed by fluid flow out of a second port, re-entry into the bypass valve through the fourth port then into the third port, the fluid exiting from the third port where it no longer re-circulates through the bypass valve; and
the second valve position disposes the first sealing element to open the third port to fluid communication with the first and second ports and disposes the second sealing element to close the third port from fluid communication with the fourth port such that the direction of the fluid flow through the bypass valve in the second position:
begins with fluid flow into the first port, followed by fluid flow out of the second port, re-entry into the bypass valve through the fourth port, wherein fluid flow is prevented from accessing the third port following re-entry of a fluid into the bypass valve, fluid flow re-entry into the bypass valve eventually ceasing, and
fluid flow from entry into the first port is directed directly to the third port, the fluid exiting from the third port where it no longer re-circulates through the bypass valve.

11. The valve assembly of claim 10, wherein the actuator is an electromechanical solenoid and the movable armature is movable in response to a first electrical signal and a second electrical signal applied to the electromechanical solenoid.

12. The valve assembly of claim 11, wherein the solenoid comprises a coil, and further comprising a power source controlled by a controller for providing the first electrical signal and the second electrical signal to the coil.

13. The valve assembly of claim 11, wherein the first position of the movable armature corresponds to the first valve position and the second position of the movable armature corresponds with the second valve position.

14. The valve assembly of claim 11, wherein the first electrical signal corresponds to a de-energized solenoid condition and the second electrical signal corresponds to an energized solenoid condition.

* * * * *